United States Patent Office 3,045,517
Patented July 24, 1962

3,045,517
STRIP THICKNESS CONTROL APPARATUS
John W. Wallace, Orchard Park, and Robert E. Hull, Eggertsville, N.Y., assignors to Westinghouse Electric Corporation, East Pittsburgh, Pa., a corporation of Pennsylvania
Filed May 29, 1957, Ser. No. 662,425
7 Claims. (Cl. 80—56)

The present invention relates, in general, to control apparatus for automatically controlling a predetermined operation relative to a workpiece, and more particularly relates to control apparatus for controlling the thickness or gauge of a moving strip of material, such as metal.

It is an object of the present invention to provide improved motor control apparatus, and more particularly to provide improved apparatus for controlling the operation of one or more motors of a strip rolling mill or the like, to thereby better control the gauge or thickness of the strip relative to a particular stand of the mill and in accordance with the operating speed of the mill.

It is a further object of the present invention to provide improved control apparatus for controlling the relative positions of a pair of work members operative with a moving workpiece to control a predetermined parameter of said workpiece, such that a first and faster acting control system is provided to correct for fast changes in said parameter of the workpiece relative to a predetermined value for said parameter and a second and slower acting control system is provided to correct for slow changes in said parameter of the workpiece relative to a predetermined value for said parameter.

It is an additional object of the present invention to provide improved control apparatus for a strip rolling mill, which apparatus is provided with a gain characteristic and response time that varies in accordance with the operating speed of the mill.

It is another object of the present invention to provide improved control apparatus for a strip rolling mill which apparatus is more stable in its operation by responding differently to a deviation or error in the operation of the mill relative to a predetermined desired or reference operation and in accordance with and as a function of the operative speed of the mill, to thereby more accurately control the operation of the rolling mill.

It is a different object of the present invention to provide improved control apparatus for a strip rolling mill which apparatus is operative to better control the strip gauge or thickness by better and in a more stable manner controlling the screwdown spacing of the roller members of any particular stand of the rolling mill.

It is still another object of the present invention to provide improved control apparatus for a strip rolling mill for better holding the screwdown spacing of a particular pair of roller members substantially constant or as may be desired relative to a predetermined reference, and to thereby improve the operation of the rolling mill regarding On gauge or desired thickness strip.

These and other objects and advantages of the present invention will become apparent in view of the following description taken in conjunction with the drawings, wherein.

Figure 1:
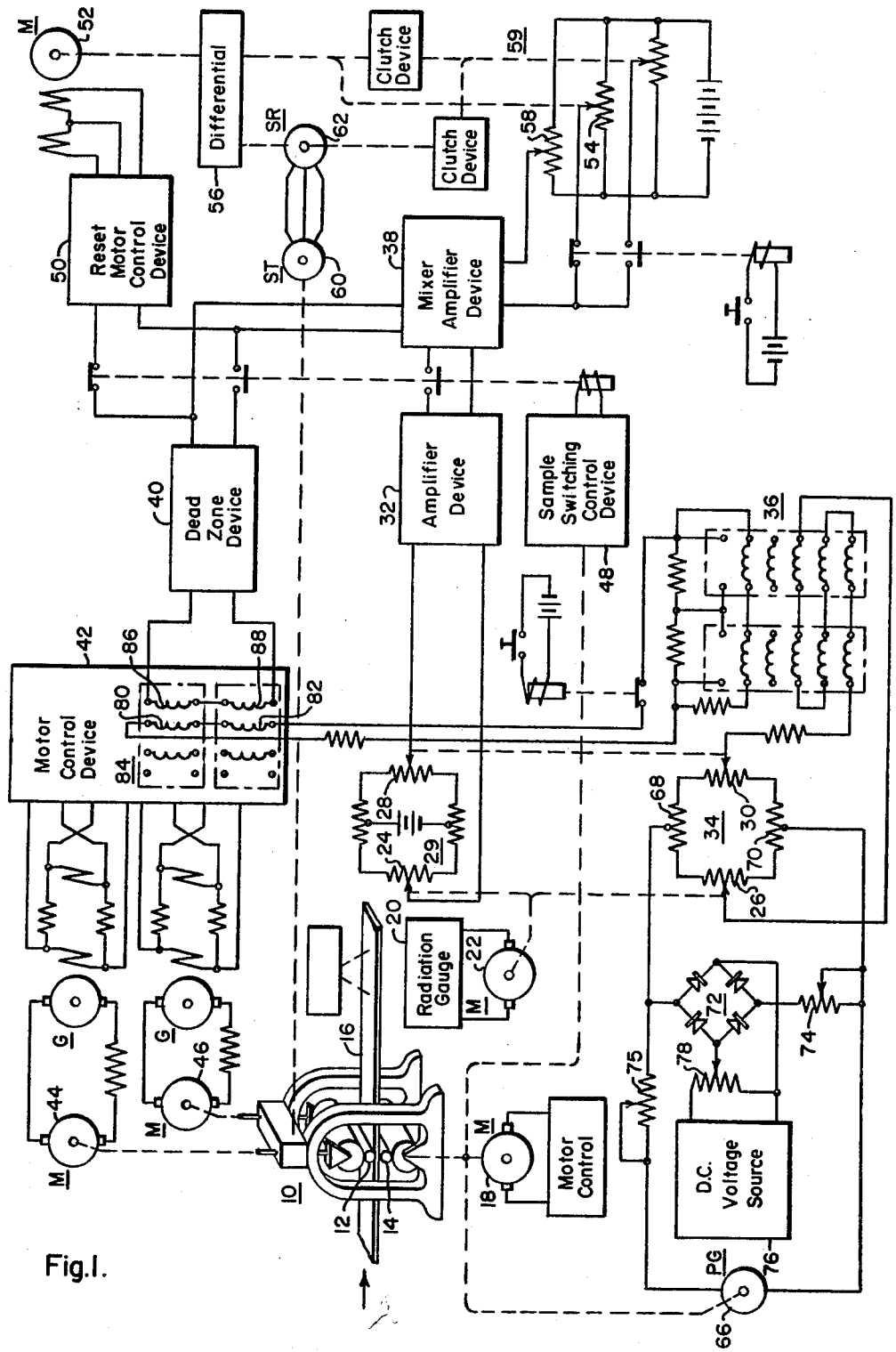
FIGURE 1 is a schematic showing of the control apparatus in accordance with the present invention.

In FIG. 1 there is shown a well-known rolling mill 10 including an upper roller member 12 and a lower roller member 14 operative with a strip 16 of material. A mill motor 18 is operative to control the movement speed of the strip 16 through the rolling mill 10. A well-known radiation gauge 20 is operative with a servo motor 22 to vary the position of a control arm on a first potentiometer device 24 and to vary the position of a control arm on a second potentiometer device 26 in accordance with the actual thickness of the strip 16. In this regard, the control arm of a potentiometer device 28 and the control arm of a potentiometer device 30 are positioned in accordance with a predetermined desired strip thickness. The potentiometer devices 24 and 28 are part of a first control bridge circuit 29 operative to provide a control signal to the amplifier device 32 in accordance with the error or deviation in the strip thickness relative to said predetermined desired strip thickness. Similarly, the potentiometer devices 26 and 30 are part of a second control bridge circuit 34 operative to provide a control signal to the magnetic amplifier device 36 in accordance with said error or deviation of the thickness of the strip 16. The control signal from the amplifier device 32 is supplied to a mixer amplifier device 38 and supplied through a dead-zone device 40 to a motor control device 42 for controlling the operation of a first screwdown motor 44 and a second screwdown motor 46 as described in copending application, Serial No. 662,479, filed May 29, 1957, by J. W. Wallace, R. E. Hull and R. W. Moore, entitled "Position Control Apparatus," and assigned to the same assignee as the present application.

In this regard, a sample switching control device 48 is mechanically coupled to and operative in accordance with the operating speed of the mill motor 18 for controlling a sampling operation such that during the sample On period the control signal from the amplifier device 32 is applied to control the operation of the screwdown motors 44 and 46. During the sample Off period, the reset motor control device 50 is operative to sense the output signal from the mixer amplifier device and to control the operation of a reset motor 52 for varying the position of a contact arm on the potentiometer device 54 through the mechanical differential device 56 to balance the settings of the control arm on the bridge or servo reset potentiometer device 54 relative to the setting of the control arm on the reference potentiometer device 58, such that a zero output or difference signal is applied to the mixer amplifier device 38 from the control bridge circuit 59. Then the sample switching control device 48 is operative to provide another sample On period and the control signal from the amplifier device 32 is again operative to control the screwdown motors 44 and 46. The screwdown motor 44 is operatively connected through a servo transmitting device 60 and a servo receiving device 62 to apply a control signal through the mechanical differential device 56 relative to the now locked servo motor 52 for varying the position of the contact arm on the bridge reset potentiometer device 54 in accordance with the movement of the screwdown motor 44, such that the control bridge 59 including the potentiometer device 54 and the potentiometer device 58 provides a control signal, to cancel out the control signal received from the amplifier device 32, and corresponding to the movement of the screwdown motors 44 and 46 to provide a full correction for any error or deviation in the thickness of the strip 16 as sensed by the radiation gauge device 20. This operation is fully explained in said copending application Serial No. 662,479, filed May 29, 1957, entitled "Position Control Apparatus."

A pilot generator 66 is operatively connected to the mill motor 18 such that it is driven at a speed corresponding to the operating speed of the mill motor 18, and corresponding to the movement speed of the strip 16, to provide a control voltage to the center connection provided on each of the potentiometer devices 68 and 70, respectively, of the control bridge 34 to thereby vary the applied voltage across the control bridge 34 as a function of the operating speed of the rolling mill 10. A control circuit including a rectifier bridge device 72 and an impedance member 74 is connected in parallel with the control bridge 34 and is operative with a direct-current voltage source 76 and an impedance member 78 such that at a predetermined value of the output voltage of the pilot generator 66, the value of the voltage supplied from across the impedance device 78 is overcome, such that a current will flow through the impedance device 74. This latter current flowing through the impedance device 74 when added to the current already flowing through the impedance device 75 increases the voltage drop across the latter impedance device 75 to thereby change the voltage applied across the control bridge 34. The control signal received from between the control arms on the respective potentiometer devices 26 and 30, and corresponding to the error or deviation in the thickness of the strip 16 relative to a predetermined desired thickness, is applied to the input control windings of a magnetic amplifier device 36. For values of the output voltage of said pilot generator 66 below a predetermined value as determined by the setting of the control arm on the impedance member 78, the proportional control system including the amplifier device 36 has a first gain characteristic lower than the gain characteristic of the sampling control system including the amplifier device 32. However, when the output voltage from the pilot generator 66 exceeds the predetermined value at which the branch circuit including the bridge 72 and the impedance member 74 becomes conductive, then the proportional control circuit including the amplifier device 36 has a second and still lower gain characteristic relative to said first gain characteristic.

The output control signal from the amplifier device 36, which is part of the proportional control system, is applied to the input control windings 80 and 82 of a magnetic amplifier device 84 provided within the motor control device 42. The control signal from the sampling control system as received from the amplifier device 32 and passing through the mixer amplifier device 38 and the dead-zone device 40 is applied to a second pair of input control windings 86 and 88, such that the control signal received from the proportional system including the amplifier 36 is additive relative to the control signal received from the sampling control system including the amplifier device 32. The latter operation and the operation of the motor control device 42 for controlling the screwdown motors 44 and 46 are believed to be fully explained in the above-referenced copending application Serial No. 662,479, filed May 29, 1957.

Figure 2:
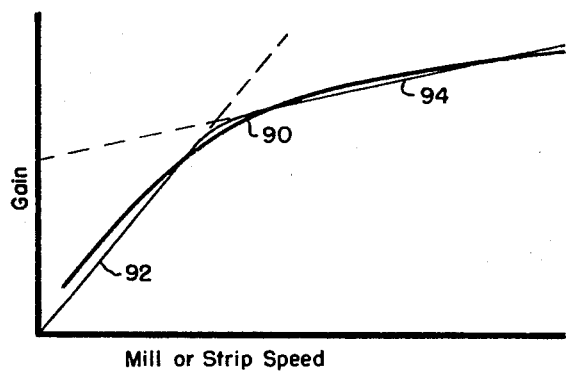
FIG. 2 shows a curve chart illustrating the operation of the present control apparatus.

In FIG. 2, there is shown a curve chart illustrating the desired gain characteristic as a function of mill speed for the proportional system including the amplifier device 36 as shown in FIG. 1. The curve 90 illustrates the theoretically desired gain characteristic for the closed loop proportional regulating system, and the first straight line 92 illustrates the gain characteristic obtained by the operation of the control bridge circuit 34 when the output voltage of the pilot generator 66 is below a predetermined value corresponding to a preretermined movement speed of the strip 16 and a predetermined operating speed of the mill 10 and at which it is desired to lower the gain characteristic of the proportional system including the amplifier device 36. The line 94 illustrates the latter lowered gain characteristic obtained when the parallel connected conductive path including the rectifier bridge 72 and the impedance member 74 becomes conductive by virtue of the output voltage of the pilot generator 66 exceeding the voltage drop across the impedance device 78 as determined by the setting of the contact arm of the latter impedance device 78.

In this regard, the control bridge circuit 34 within the proportional control system is operative, in combination with the gain control circuit including the rectifier bridge 72 and the impedance member 74 operative with the direct-current voltage source 76 and the impedance member 78, such that up to a predetermined mill speed corresponding to a predetermined output voltage level from the pilot generator 66, the bridge circuit 34 is operative to provide for the proportional control system a first gain characteristic in accordance with the straight line curve 92. At a predetermined mill speed and the corresponding output voltage level from the pilot generator 66, the shunt gain control circuit including the rectifier bridge 72 and the impedance member 74 becomes conductive such that the current flowing through the latter impedance member 74 is operative by changing the voltage applied across the control bridge 34 to change the gain characteristic of the proportional control system including the amplifier device 36 in accordance with the straight line curve 94, such that the desired gain characteristic as indicated by the theoretical continuous curve 90 is thereby empirically approximated and effected for the purpose of controlling the screwdown motors 44 and 46 to provide the desired correction relative to the thickness of the strip member 16 as a function of the operating speed of the rolling mill 10.

The voltage applied across the control bridge 34 and in accordance with the curve 92 is a linear function of strip speed; the slope of the gain characteristic is changed above a predetermined strip speed and in accordance with the curve 94. Thusly the gain of the closed loop proportional acting regulation system is varied as a function of strip or mill speed. If desired, as many additional shunt gain control circuits could be provided as required to approximate as closely as desired the actual shape of the theoretically desired gain versus speed curve 90.

Figure 3:
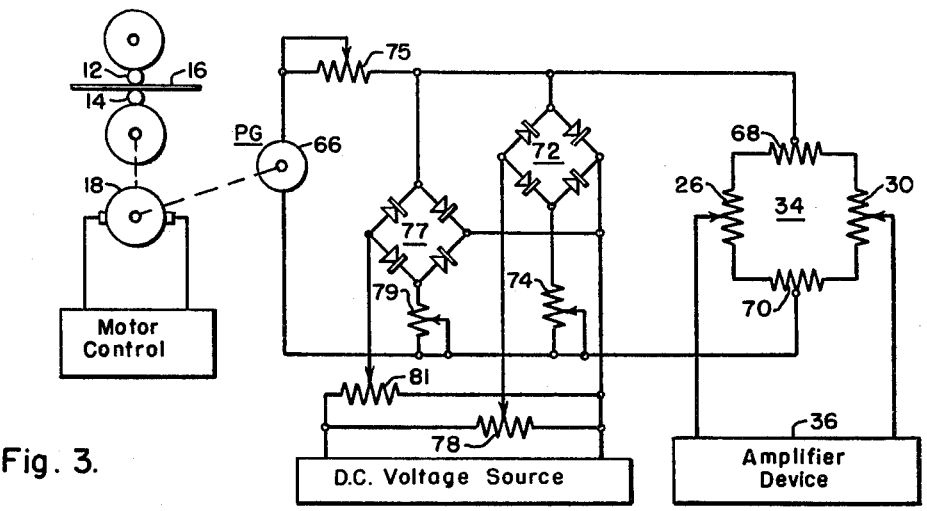
FIG. 3 illustrates a modification of the present control apparatus.
Figure 4:
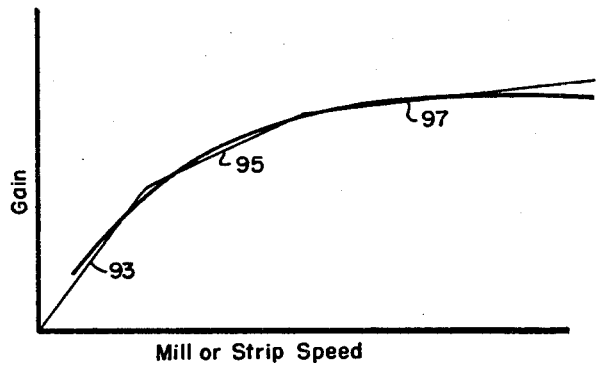
FIG. 4 shows a curve chart illustrating the operation of the latter modification.

In FIGURE 3 there is illustrated a gain control circuit operative with the control bridge 34 and including a first shunt path including impedance device 74 and a second shunt path including impedance device 79. The impedance device 78 is provided with a first voltage setting, and the impedance device 81 is provided with a second and different voltage setting that may be larger than the latter first voltage setting. Thusly, and as shown in FIGURE 4, the curve 93 is obtained by a first value of voltage being applied across the control bridge 34 up to a first predetermined value of the output voltage from the pilot generator 66; then the first shunt path including impedance device 74 becomes conductive to apply a second and lower value of voltage across the control bridge 34 and the curve 95 is obtained. Then at a second and greater predetermined value of output voltage from the generator 66, the second shunt path becomes conductive to apply a third and still lower value of voltage across the control bridge 34, and the curve 97 is obtained.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

We claim as our invention:

1. In control apparatus for a strip rolling mill including a pair of roller members operative with a moving strip for controlling the thickness of said strip, with said mill further including a motor operative with at least one of said roller members to control the spacing between said roller members, the combination with said rolling mill of a strip thickness sensing device operative to provide a first control signal that varies as a function of the thickness of said strip, a control device including signal value sensing means and being responsive to said first control signal and operative with said motor for controlling the spacing between said roller members in accordance with the variations of said first control signal, a strip speed sensing device operative to provide a second control signal that varies as a function of the movement speed of said strip, with said signal value sensing means of the control device being responsive to said second control signal for effecting a first gain characteristic for strip speeds below a predetermined value and a second gain characteristic for strip speeds above said predetermined value to cooperate with said first control signal for controlling the spacing between said roller members.

2. A control apparatus for a strip rolling mill including a pair of roller members operative with a moving strip for controlling the thickness of said strip, with said mill further including a motor operative with at least one of said roller members to control the spacing between said roller members, the combination with said rolling mill of a strip thickness sensing device operative to provide a first control signal that varies as a function of the thickness of said strip, a first control device operative with said motor and responsive to said first control signal for controlling the spacing between said roller members in accordance with the variations of said first control signal, a second control device operative with said motor and responsive to said first control signal for controlling the spacing between said roller members in accordance with the variations of said first control signal, with said second control device having a lower gain characteristic than said first control device, and a strip speed sensing device operative to provide a second control signal that varies as a function of the movement speed of said strip, with said second control device being responsive to said second control signal for effecting a first gain characteristic for strip speeds below a predetermined value and a second gain characteristic for strip speeds above said predetermined value.

3. In control apparatus for a strip rolling mill including a pair of roller members operative with a moving strip for controlling the thickness of said strip, with said mill further including a motor operative with at least one of said roller members to control the spacing between said roller members, the combination with said rolling mill of a strip thickness sensing device operative to provide a first control signal that varies as a function of the thickness of said strip, a control device operative with said motor and responsive to said first control signal for controlling the spacing between said roller members in accordance with the variations of said first control signal, a strip speed sensing device operative to provide a second control signal that varies as a function of the movement speed of said strip, with said control device being responsive to said second control signal for changing in accordance with the variations of said second control signal the response of said control device to said first control signal, with said control device including a control circuit having at least first and second current paths, with one of said current paths being non-conductive until said second control signal reaches a predetermined value and then being conductive to thereby change the response of said control device to said first control signal.

4. In control apparatus for a machine device including a first work member and a second work member operative with a moving workpiece for performing a predetermined operation relative to said workpiece, with said machine device including a motor operatively connected to at least one of said work members for controlling a predetermined relationship between said work members, the combination with said machine device of a workpiece parameter sensing device operative with said workpiece for providing a first control signal that varies as a function of the value of a predetermined parameter of said workpiece, a control device operative with said motor and responsive to said first control signal for controlling said predetermined relationship between said work members in accordance with the variations of said first control signal, a workpiece movement speed sensing device operative to provide a second control signal that varies as a function of the movement speed of said workpiece, with said control device being responsive to said second control signal for changing the response of said control device to said first control signal in accordance with the variations of said second control signal, with said control device including a control circuit operative with said second control signal to provide a first response characteristic for values of said second control signal below a predetermined value and to provide a second and lower response characteristic for values of said second control signal above said predetermined value.

5. In control apparatus for a strip rolling mill including a pair of roller members operative with a moving strip for controlling the thickness of said strip, with said mill further including a motor operative with at least one of said roller members to control the spacing between said roller members, the combination with said rolling mill of a strip thickness sensing device operative to provide a first control signal that varies as a function of the thickness of said strip, a control device responsive to said first control signal and operative with said motor for controlling the spacing between said roller members in accordance with the variations of said first control signal, a strip speed sensing device operative to provide a second control signal that varies as a function of the movement speed of said strip, with said control device being responsive to said second control signal for effecting a first response characteristic for strip speeds below a predetermined value and a second response characteristic for strip speeds above said predetermined value relative to the response to said first control signal for controlling the spacing between said roller members, with said control device including a control circuit operative with said control device for controlling the response characteristic of said control device, with said control circuit having at least a first conductive path for values of said second control signal below a predetermined value and providing at least a pair of parallel connected conductive paths for values of said control signal above said predetermined value.

6. In control apparatus for a strip rolling mill including a pair of roller members operative with a moving strip for controlling the thickness of said strip, with said mill further including a motor operative with at least one of said roller members to control the spacing between said roller members, the combination with said rolling mill of a strip thickness sensing device operative to provide a first control signal that varies as a function of the thickness of said strip, a control device responsive to said first control signal and operative with said motor for controlling the spacing between said roller members in accordance with the variations of said first control signal, a strip speed sensing device operative to provide a second control signal that varies as a function of the movement speed of said strip, with said control device being responsive to said second control signal for effecting a first response characteristic for strip speeds below a predetermined value and a second response characteristic for strip speeds above said predetermined value relative to the response to said first control signal for controlling the spacing between said roller members, with said control device including a control circuit for controlling the response characteristic of said control device, with said control circuit having at least a first conductive path for values of said control signal below a predetermined value and having at least a pair of parallel connected conductive paths for values of said control signal above said predetermined value.

7. In control apparatus for a strip rolling mill including a pair of roller members operative with a moving strip for controlling the thickness of said strip, with said mill further including a motor operative with at least one of said roller members to control the spacing between said roller members, the combination with said rolling mill of a strip thickness sensing device operative to provide a first control signal that varies as a function of the thickness of said strip, a first control device operative with said motor and responsive to said first control signal for controlling the spacing between said roller members in accordance with the variations of said first control signal, a second control device operative with said motor and responsive to said first control signal for controlling the spacing between said roller members in accordance with the variations of said first control signal, with said second control device having a lower gain characteristic than said first control device, and a strip speed sensing device operative to provide a second control signal that varies as a function of the movement speed of said strip, with said second control device being responsive to said second control signal for effecting a first gain characteristic for strip speeds below a predetermined value and a second gain characteristic for strip speeds above said predetermined value, with said second control device including a control bridge circuit and being operative to provide a parallel shunt path relative to said control bridge circuit for values of said second control signal above a predetermined value.

References Cited in the file of this patent
UNITED STATES PATENTS

| | | |
|---|---|---|
| 2,264,095 | Mohler | Nov. 25, 1941 |
| 2,687,052 | Zeitlin | Aug. 24, 1954 |
| 2,708,254 | Macaulay et al. | May 10, 1955 |
| 2,735,051 | Gille | Feb. 14, 1956 |
| 2,851,911 | Hessenberg | Sept. 16, 1958 |

FOREIGN PATENTS

| | | |
|---|---|---|
| 533,162 | Great Britain | Feb. 7, 1941 |

OTHER REFERENCES

"Rolling Slabs Into Strip Steel" (Vossberg), Control Engineering, September 1956 (pages 116 and 117 relied on).